Aug. 4, 1959   J. F. SEXTON   2,897,521
BEEHIVE
Filed Nov. 1, 1957   2 Sheets-Sheet 1
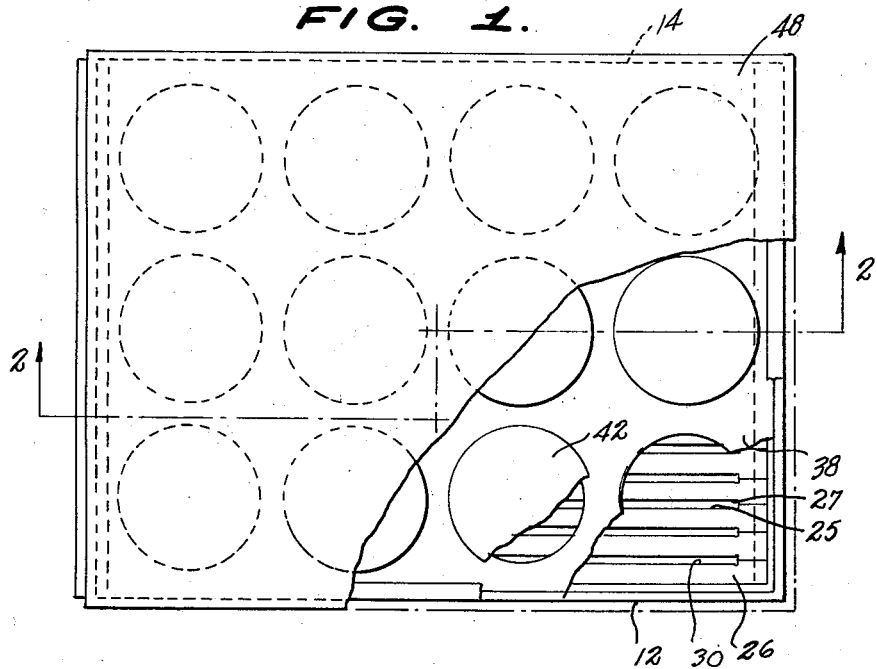
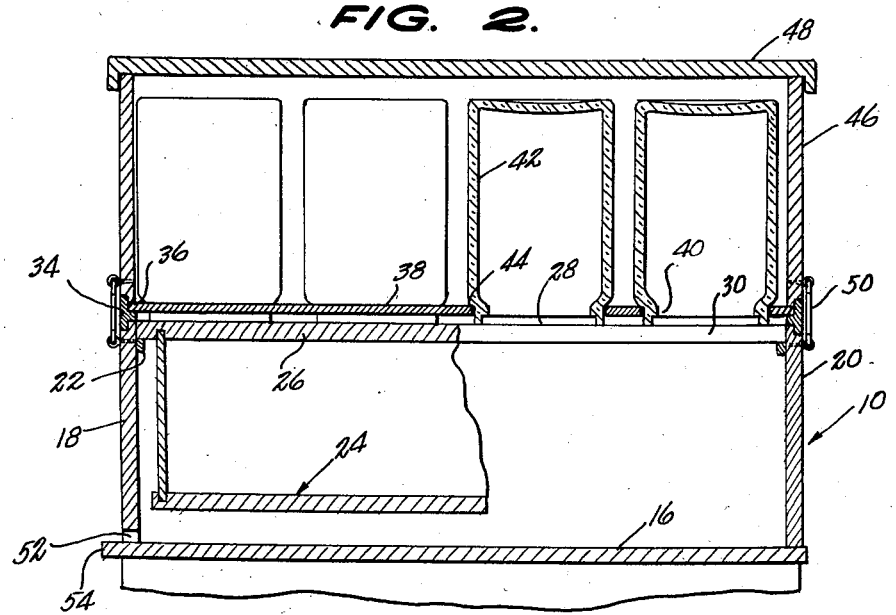
INVENTOR.
JAMES F. SEXTON,
BY
McMorrow, Berman & Davidson
ATTORNEYS.

Aug. 4, 1959   J. F. SEXTON   2,897,521
BEEHIVE

Filed Nov. 1, 1957   2 Sheets-Sheet 2

INVENTOR.
JAMES F. SEXTON,
BY
McMorrow, Berman + Davidson
ATTORNEYS.

2,897,521
BEEHIVE

James F. Sexton, Fries, Va.

Application November 1, 1957, Serial No. 693,952

1 Claim. (Cl. 6—2)

The present invention relates to beehives.

An object of the present invention is to provide a beehive in which transparent and marketable containers are employed by the bees for storing of the honey, such containers being readily removable from the hive and requiring no further processing of the contents before presentation to the buying public.

Another object of the present invention is to provide a beehive super which is readily and easily assembled upon the beehive brooder portion and is as readily detached therefrom for cleaning.

A further object of the present inevntion is to provide a beehive which is of simple structure, one sturdy in construction and economically feasible, and one which is highly effective in action.

These and other objects and advantages of the present invention will be fully apparent from the following description when taken in connection with the annexed drawings, in which:

Figure 1 is a plan view with a portion of the cover broken away and with portions of one jar and the platform also broken away;

Figure 2 is a sectional view taken on the line 2—2 of Figure 1; and

Figure 3:
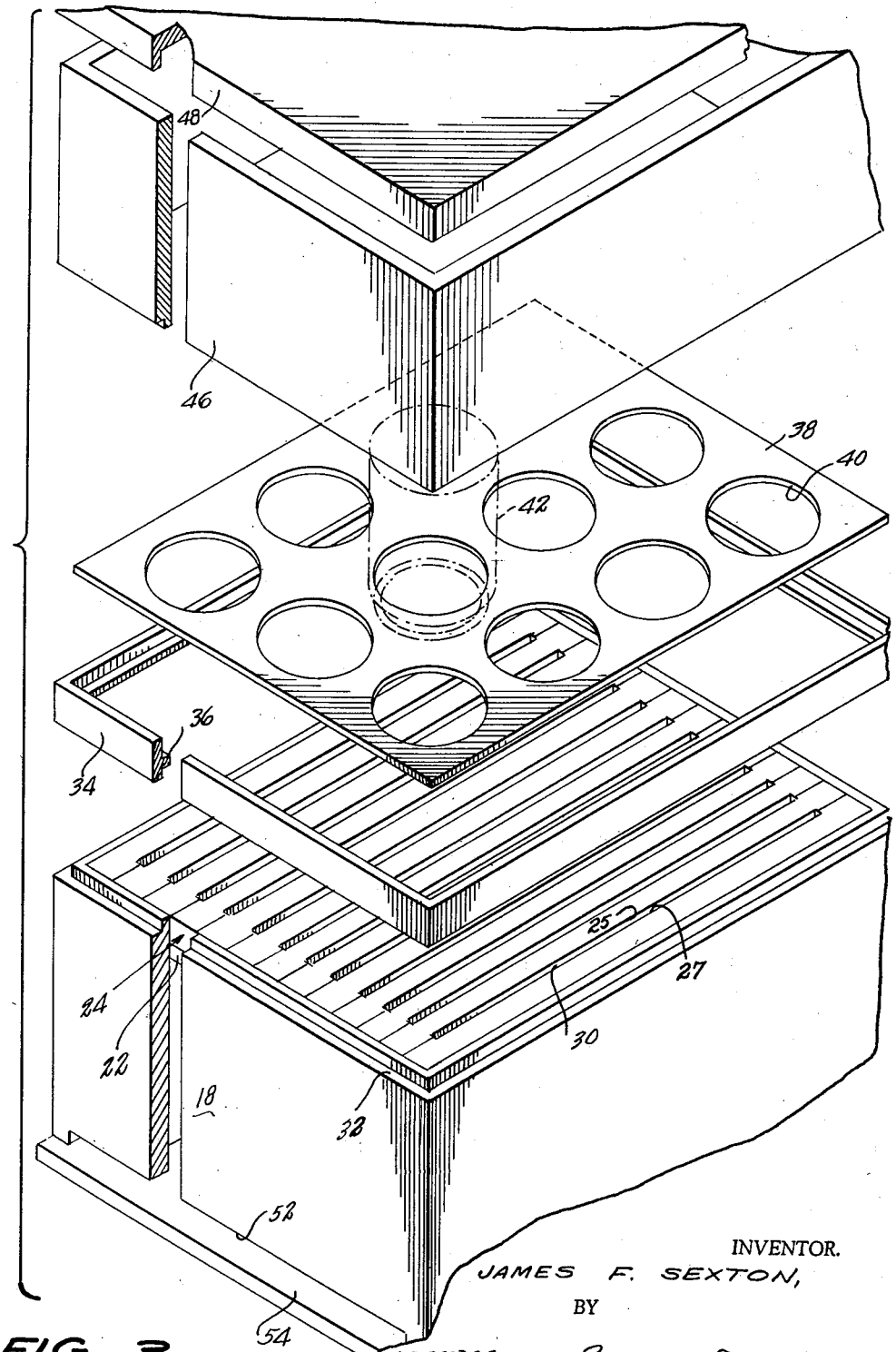
Figure 3 is an exploded isometric view of the beehive of the present invention, one of the jars being shown in dotted lines in a position of use.

Referring in greater detail to the drawings in which like numerals indicate like parts throughout the several views, the beehive of the present invention comprises a lower receptacle or brooder adapted to house a queen bee and a colony of working bees, such receptacle being designated generally by the reference numeral 10 and including spaced side walls 12 and 14 rising from a bottom 16 and end walls 18 and 20 extending between each of the adjacent ends of the side walls 12 and 14 and rising from the bottom 16.

A ledge 22 extends about the inner face of each of the end walls 18 and 20 adjacent to and spaced from the upper end thereof. A plurality of upstanding brood frames 24 are positioned within the receptacle 10 in face-to-face abutting relation with each frame 24 including an upper frame member 26 having projecting end portions supported on the adjacent ledge 22 adjacent the upper ends of the side walls 12 and 14 and end walls 18 and 20. Each upper frame member 26 has a resilient portion 25 on one side extending from a point inwardly of one end to a point inwardly of the other end. The other side of each upper frame member 26 has another relieved portion 27 of the same length as and in alignment with the relieved portion 25. The relieved portion 25 of the one upper frame member 26 forms with the relieved portion of the next adjacent upper frame member 26 a slot 30 of a size to permit ready egress of only the worker bees of a colony of bees and to prevent egress therethrough of the Queen Bee of the colony. The upper frame members 26 constitute a top for the receptacle 10 contiguous with the upper ends of the side walls 12 and 14 and the upper ends of the end walls 18 and 20, such top being designated in Figure 2 by the reference numeral 28. The top 28 extends over the space defined by the side walls 12 and 14 and the end walls 18 and 20 adjacent the upper ends of the latter.

The upper ends of the side walls 12 and 14 and end walls 18 and 20 are provided with an outwardly facing shoulder 32 on which rests the lower end of an upstanding connector frame 34 conformably shaped to fit about the upper ends of the receptacle 10 and superimpose upon and embracingly engaging the portions of the side and end walls above the shoulder 32.

A ledge 36 extends about and projects from the inner face of the connector frame 34 intermediate the lower and upper end thereof and engages the upper ends of the side walls 12 and 14 and end walls 18 and 20.

A platform 38, conformably shaped to fit within the connector frame 34 above the ledge 36, bridges the space defined by the ledge 36 and is supported upon the ledge 36. The platform is provided with a plurality of openings 40 arranged in spaced relation, each opening 40 being of a size to receive the neck portion of a transparent jar 42, one of which is shown in dotted lines in Figure 3 and others of which are shown in full lines in Figures 1 and 2.

Each jar 42 includes an open end and a closed end and is arranged in an upright position with the open end extending through one of the openings 40 in the platform 38 and facing the slots 30 in the top of the receptacle 10. Each jar 42 has an external shoulder 44 for support of the jar 42 upon the platform 38 with the open end of the jar 42 resting upon the receptacle top 28 or upper face of the adjacent portions of the brooder upper frame members 26. The jars 42, when positioned within the beehive of the present invention, have their closed ends remote from and spaced above the platform 38.

An open frame or super 46, conformably shaped to fit and rest upon the upper end of the connector frame 34, is supported on the connector frame 34 and has its upper end closed by a cover 48. The super 46 and cover 48 constitute a hood conformably shaped to enclose the platform 38 and the upright inverted jars 42, with the hood thus formed superimposed upon the platform 38 and detachably secured thereto.

Conventional hook and eye assemblies 50 are used to connect the end walls of the super 46 with the end walls 18 and 20 of the receptacle 10.

The receptacle 10 is provided with a slot constituting an entrance 52 in the lower end of the end wall 18 and with an apron 54 projecting from the adjacent portion of the bottom 16. In the isometric view of Figure 3, the receptacle end wall 18, the connector frame 34, and the super 46, and the cover 48 have portions broken away to show their cross-sectional configuration.

In use, a colony of bees including the Queen Bee is introduced into the receptacle 10 and conventional means is provided bridging the hive entrance 52 for permitting ingress and egress of the worker bees and drones of the colony, but preventing egress therefrom of the Queen Bee. Slots 30 formed by the relieved portions 25 and 27 of the upper frame members 26 permit the worker bees to have free access to the space above the receptacle top 28 and into the area defined by the connector frame 34, the super 46 and the cover 48.

When the brood frames are fitled with honey, the worker bees will extend their activities upwardly into the cavities of the jars 42 building therein the combs and filling the combs with honey in the usual manner.

The seating of the open ends of the jars 42 upon the upper surfaces of the upper brood frame members 26 prevents the bees from entering the space within the super 46 exteriorly of the jars 42 and effectively prevents the deposit of any beeswax or honey on the outside of the jars 42. Thus, it will be seen that the jars 42 when completely filled with honey may be removed by lifting of the cover 48 and removal and replacement of any filled jar 42 with an empty one. This may be done quickly and if no bees are present in the open end of the jar 42 as it is removed, it will not be necessary to smoke the hives to quiet the bees therein. If only a few bees are present adjacent the jar to be removed, the application of smoke to the area should be sufficient to quiet the bees which are disturbed.

While only a single embodiment of the present invention has been shown and described, other embodiments are contemplated and numerous changes and modifications may be made therein without departing from the spirit of the invention as set forth in the appended claim.

What is claimed is:

In a beehive, a receptacle adapted to house a queen bee and a colony of working bees and including a bottom, spaced side walls rising from said bottom, an end wall extending between each of the adjacent ends of said side walls and rising from said bottom, the top extending over the space defined by said side walls and end walls adjacent the upper ends of said last-mentioned walls and supported upon the upper ends of said side and end walls, said top being provided with a plurality of slots arranged in parallel spaced relation, each of said slots being of a size to permit ready egress of only working bees therethrough, and a ledge extending about the inner face of each of said end walls inwardly of the upper ends of the latter, a plurality of upstanding brood frames arranged in face-to-face abutting relation positioned within said receptacle and supported from said ledges, each frame having an upper frame member provided with a relieved portion intermediate its ends, the relieved portions of the adjacent upper frame members defining a slot of a size to permit ready egress of only working bees therethrough, an upstanding connector frame conformably shaped to fit about the upper end of said receptacle superimposed upon and having the lower end portion embracingly engaging said side and end walls adjacent the upper ends of the last-mentioned walls, another ledge extending about and projecting from the inner face of said connector frame intermediate the ends thereof and engaging the upper ends of said receptacle side and end walls, a platform bridging the space defined by said another ledge and supported upon said another ledge, said platform having a plurality of openings arranged in spaced relation, and a plurality of transparent jars each including an open end and a closed end, each jar being arranged in an upright position with the open end extending through an opening in said platform and facing the slots in said top and supported in the platform and the closed end spaced above the platform.

References Cited in the file of this patent

UNITED STATES PATENTS

| | | |
|---|---|---|
| 160,695 | Mitchell | Mar. 9, 1875 |
| 176,347 | Perrine | Apr. 18, 1876 |
| 1,073,458 | Anderson | Sept. 16, 1913 |
| 2,588,370 | Elliott | Mar. 11, 1952 |
| 2,648,076 | Garrett | Aug. 11, 1953 |